United States Patent [19]

Mueller

[11] Patent Number: 5,060,410

[45] Date of Patent: Oct. 29, 1991

[54] COLLAPSIBLE SHOOTING STAND

[76] Inventor: Evan Mueller, 305 S. D St., Livingston, Mont. 59047

[21] Appl. No.: 553,738

[22] Filed: Jul. 13, 1990

[51] Int. Cl.[5] ............................................. F41A 23/06
[52] U.S. Cl. ...................................................... 42/94
[58] Field of Search .......................... 42/94; 89/37.04; 248/145, 415

[56] References Cited

U.S. PATENT DOCUMENTS

| | | | |
|---|---|---|---|
| 1,187,325 | 6/1916 | Ivey | 248/145 |
| 1,639,722 | 8/1927 | Clark | 248/145 |
| 2,079,510 | 5/1937 | King et al. | 248/145 |
| 3,125,929 | 3/1964 | Peasley | 89/37.04 |
| 3,225,656 | 12/1965 | Flaherty | 42/94 |
| 3,711,984 | 1/1973 | Dyer et al. | 42/94 |
| 3,827,172 | 8/1974 | Howe | 42/94 |
| 4,007,554 | 2/1977 | Helmstadter | 42/94 |
| 4,506,466 | 3/1985 | Hall | 42/94 |
| 4,535,559 | 8/1985 | Hall | 42/94 |
| 4,937,965 | 7/1990 | Narvaez | 42/94 |

Primary Examiner—Charles T. Jordan
Attorney, Agent, or Firm—D. L. Tschida

[57] ABSTRACT

A collapsible seating assembly including a support platform whereon a rifle, camera or the like may be rigidly supported. A multi-legged base rotatively supports a triangular framework stanchion and to which a height adjustable seat is separately mounted. When constructed as a shooting assembly, the platform supports an adjustable, clamp mounted V-shaped barrel support or other sighting mechanisms.

11 Claims, 5 Drawing Sheets

COLLAPSIBLE SHOOTING STAND

BACKGROUND OF THE INVENTION

The present invention relates to a portable support stand and more particularly to a portable, folding stand which provides a rotating seat and weapon support platform, whereby a 360 degree field of rotation is permitted.

Bench support platforms are desired by marksmen when shooting relatively long distances or such as when sighting a rifle or pistol. The bench assembly provides a very stable reference support and typically includes the convenience of a seat. Oftentimes the bench further includes a tabletop for supporting a spotting scope and other shooting paraphernalia.

Benches can be found in a variety of constructions, most of which comprise permanent non-transportable assemblies. That is, they provide for a rather substantial and relatively heavy tabletop or platform portion, which is anchored to a base that is secured to the ground, and either include a seat or provide an area closely adjacent to the platform for a detached seat. These assemblies are commonly found at permanent shooting ranges.

Portable shooting benches also exist for use at non-permanent range sites, in the field or wherever a safe, convenient location can be found. For example, U.S. Pat. No. 4,535,559 to Hall describes such a device having a separate stool for the shooter. However, with this device each time a marksperson desires to shoot in a different direction, he/she must stand, re-set the stool in a completely new location, re-seat themselves and then re-aim the weapon. This process is very time consuming and awkward. In uneven terrain, the stability of the stool may be such that when the marksperson attempts to shoot, it is necessary to reposition the stool a number of times before a stable position is obtained.

Other portable shooting benches have been proposed which include a seat mounted to the bench. To change the direction of shooting with these benches, however, the entire bench assembly must be repositioned. U.S. Pat. No. 3,125,929 to Peasley; U.S. Pat. No. 3,711,984 to Dyer et al.; and U.S. Pat. No. 4,506,466 to Hall all illustrate this type of shooting bench.

While each of the aforementioned devices may function satisfactorily for the general purpose, there remains a need for a portable assembly which provides a 360 degree field of rotation relative to a comfortable and also rotatable support platform. A further need exists for a portable shooting stand having a seat which accommodates right or left hand shooters and which rotates to accommodate shots in all directions, without the necessity of repositioning the seat or the entire shooting stand.

SUMMARY OF INVENTION

It is accordingly a primary object of the present invention to provide a lightweight, portable support assembly, including a rotatable seat portion and support platform for supporting a weapon, camera or any other mechanism, which requires a relatively stable, operator controlled mounting.

It is a further object of the invention to provide an assembly having a seat which is rotatably mounted relative to the support platform.

It is a yet further object of the invention to provide an assembly wherein the seat and support platform are each rotatable relative to each other and to a multi-legged support base.

These and other objects and advantages of the invention are particularly obtained in a presently preferred construction which comprises a collapsible and portable shooting stand. The stand includes a base which rests on the ground and an elongate standard triangular stanchion assembly which removably mounts in upright vertical relation to the base for rotation about a longitudinal axis of a standard member and the base.

A horizontal member having an end attached to the upper end of the standard serves as a support platform. It comprises one leg of the triangular stanchion framework and is rigidly secured to the upper portion of the standard, while the standard forms a second leg of the triangle. An angularly extending hypotenuse member, which projects from the lower portion of the standard to the end of the horizontal member, distal the end secured to the standard, completes the triangle. The mounting of the triangular framework to the base is such that the framework may in turn be rotated 360 degrees about the longitudinal axis of the base. A hold-down mechanism is attached to the angular member which finds application when collapsing the stand for transport.

A cantilevered seat is connected to the standard such that the seat may independently rotate about the longitudinal axis of the standard to accommodate right or left handed users and to enable a seated user to shoot in any desired direction. The height of the seat may also be adjusted as desired relative to the ground and to the platform to accommodate shooters of different physical sizes.

The shooting stand is collapsible at the interconnection between the standard and base so that the user, when finished with the stand, can remove the standard from the base and the seat from its fitting and reassemble the individual pieces into luggage-like collapsed configuration. The individual pieces lock together in the collapsed configuration for transportation to a new location.

Still other objects, advantages and distinctions of the invention will become more apparent from the following description with respect to a preferred construction and variously considered modifications and improvements thereto with reference to the accompanying drawings. The invention should not be interpreted in strict limitation to the provided disclosure, however, but rather should be interpreted within the scope of the following claims.

DESCRIPTION OF PREFERRED EMBODIMENT

Figure 1:
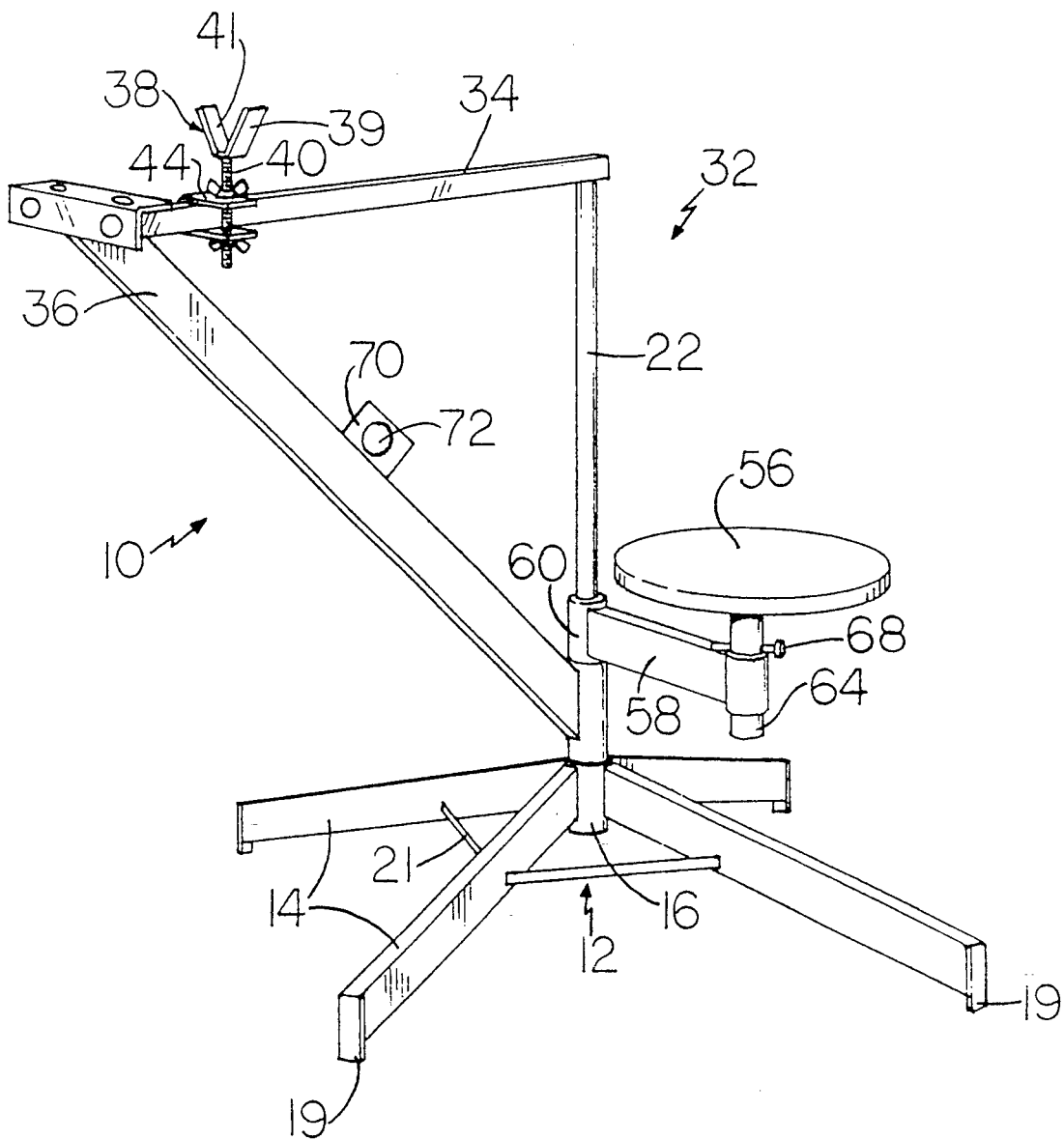
FIG. 1 shows an isometric view of a collapsible shooting stand embodying the present invention.
Figure 2:
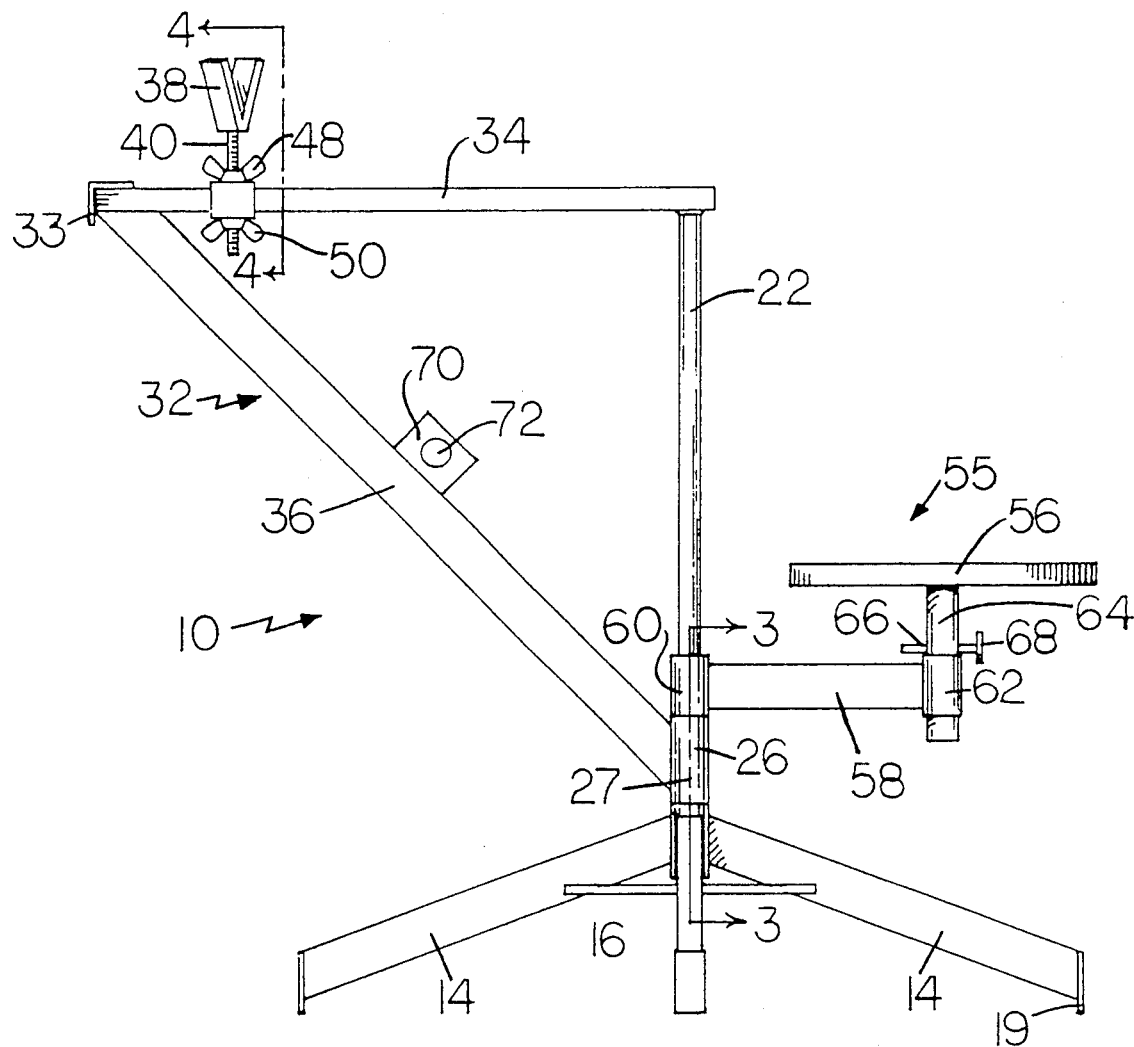
FIG. 2 shows an elevational view of the shooting stand shown of FIG. 1.

A preferred embodiment of the collapsible shooting stand 10 is shown in FIGS. 1 and 2. For this construction a base 12 provides a number of tubular legs 14 which project radially and downwardly in canted relation to a vertical central sleeve of a journal 16 which has an interior bore 18 (reference FIG. 3). The free ends of each leg 14 include a downwardly extending spike 19 to pierce the ground surface and reduce possible lateral movement of the stand 10, when the stand 10 is positioned on the ground.

Although four legs 14 are equally spaced around the journal 16, it is to be appreciated a different number of legs 14 could also be used, with or without the spikes 19. Spacers or braces 21 extend between each leg and add structural rigidity to the assembly. Although, too, the legs 14 presently are rigidly secured to the journal 16 and each other, they could be detachable via slip connections at the journal 16 or could separately rotate relative to the journal 16 to form a smaller configuration when collapsed.

Figure 3:
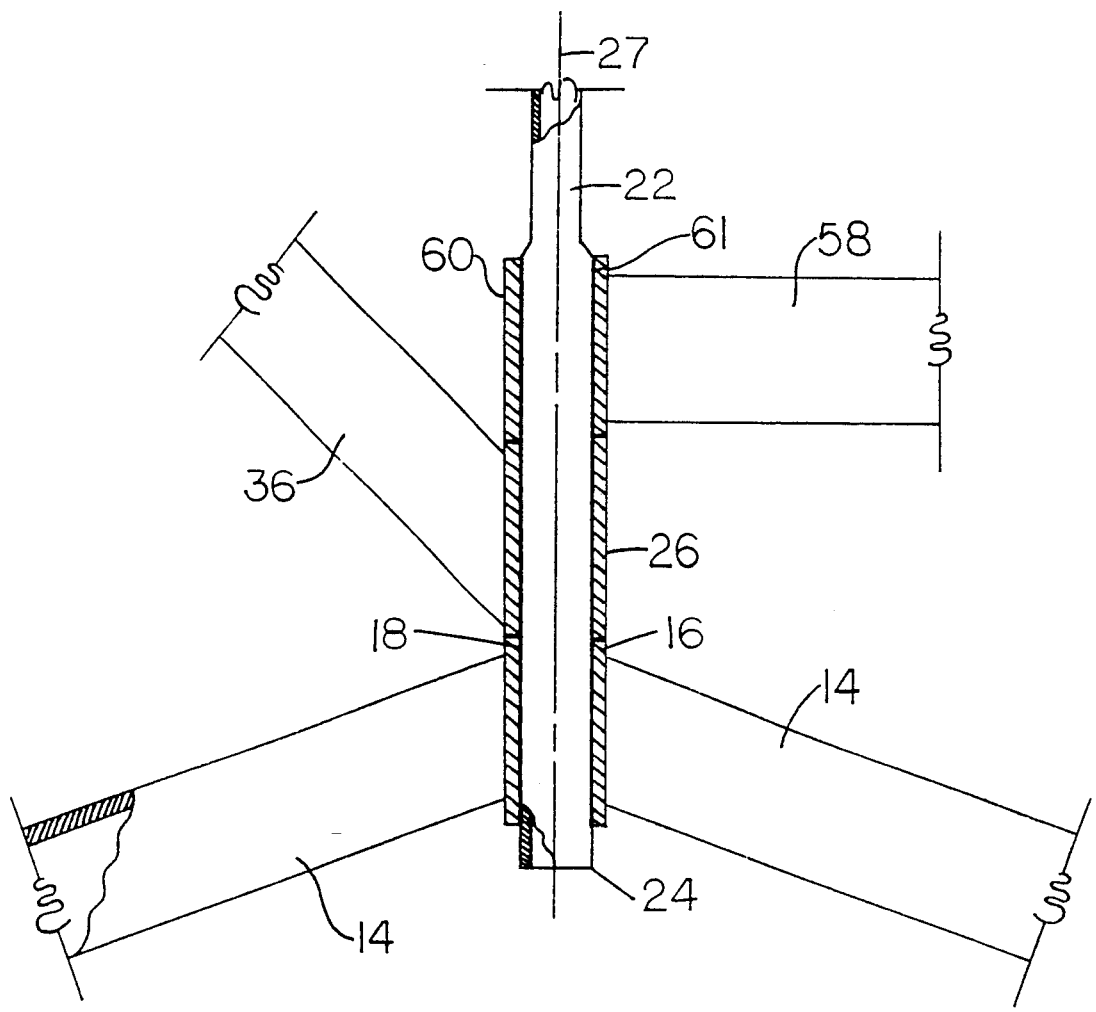
FIG. 3 shows a partial cross-section view taken along reference line 3—3 of FIG. 2.

Referring to FIG. 3, an elongated standard 22 vertically rises from the base 12 and includes an end 24 which is formed to slidably mount within the bore 18 of journal 16. The standard 22 further includes an enlarged portion 26, immediately above the portion 24, which limits the insertion depth of the end 24 into bore 18. With the end 24 resting in bore 18 and the interface between the portion 26 acting as a bearing surface relative to the journal 16, the standard 22 is free to rotate about a center longitudinal axis 27 which is coaxial with the standard 22 and the base 12.

The standard 22 otherwise forms one frame member of a triangular framework stanchion 32. A horizontal member 34 having one end rigidly connected to the upper end of the standard 22, as shown in FIG. 2, extends outwardly and generally perpendicular to standard 22 to form a second leg of the triangular framework 32. The horizontal member 34, although described in greater detail below generally serves as a support surface for a seated occupant.

A transversely mounted member 33 is also secured to the outer end of the member and may be used to secure various assemblies thereto, such as a table top. Two of such peripheral assemblies that Applicant particularly uses with advantage and with an angle iron member 33 are disclosed in Applicant's copending U.S. patent application, entitled Gun Sighting Device, Ser. No. 553,737, filed July 13, 1990.

A hypotenuse member 36 having one end rigidly connected to the outer end of the horizontal member 34 and its other end rigidly connected to the enlarged portion 26 completes the triangular framework 32. The framework 32 otherwise, like the base 12, is formed of welded tube stock. In particular, standard 22 is formed of circular tube stock, the horizontal member 34 is formed from square tube stock and the member 36 is formed from a rectangular tube stock. The strength, type and sizes of such members are selected for the typically encountered loading. While the framework 32 is presently of a rigid construction, it could also be constructed to collapse or fold at the points of interconnection of the frame members.

Depending upon the use of the assembly 10, a variety of devices may be supported from the horizontal support member 34. For the present shooting stand application, a V-shaped barrel rest 38, shown in FIGS. 1 and 2, clamp couples to the member 34. In particular, a threaded stem 40 is sized to be slidably and length adjustably received by bores in a bracket 44 relative to a pair of wing nuts/washers 48, 50. The cross sectional size and shape (e.g. C-shape) of the bracket 44 are established such that the bracket 44 is slidable along the horizontal member 34, just as a V-block 39 containing a press fit shock absorbing elastomeric pad 41 is vertically adjustable relative to the bracket 44.

Depending upon the user, the stem 40 may also be selectively positioned on either side of the horizontal member 34 to accommodate either right or lift handed shooters. In this regard, the upper wing nut/washer 48 is threaded on the stem 40 above the bracket 44 and may be adjusted to vertically position the barrel rest 38 relative to the bracket 44. The lower wing nut/washer 50 is threaded on stem 40 below bracket 44 and provides a locking or clamping action whereby, when wing nut 50 is tightened against bracket 44, the barrel rest 38 is firmly secured at its selected vertical position. The tightening of the washers/nuts 48, 50 also induces a clamping action of the bracket 44 which fixes the horizontal position of the barrel rest 38 along the horizontal member 34.

Alternatively, the stem 40 could be positioned in vertical bores formed or positioned along the horizontal member 34 with the stem 40 locked in place with one or both wing nut/washers 48, 50 at a selected one of a plurality of positions along the horizontal member 34.

The stand 10 is further provided with a seat assembly 55 which includes a height adjustable seat 56 that is connected to the standard 22 for rotation about the standard 22. A cantilevered seat support arm 58 having a transversely mounted journal 60 at one end is particularly positioned on a bearing surface 61 of the standard 22 as shown in FIG. 3. With this arrangement, the arm 58 may be rotated around the standard 22, independent of the rotation of the framework 32. Thus, the shooter, whether left or right handed, may rotate the seat to the appropriate side of the framework 32, while similarly setting the barrel rest 38 to the appropriate side of the member 34.

A second transversely mounted journal 62 is also provided at the opposite end of arm 58. This journal 62 slidably receives a shaft 64 which projects from the bottom of the seat 56 and which exhibits a diameter approximately equal to that of the bearing surface 61.

Shaft 64 is provided with a plurality of spaced apart bores 66 that extend generally perpendicular to the longitudinal axis of the shaft 64 and one of which receives a tethered lynch pin 68. The height of seat 56 above the arm 58 is adjusted by positioning the pin 68 in the appropriate bore 66 to prevent the shaft 64 from sliding downward in journal 62 as shown in FIG. 2. With this arrangement, the seat 56 can be rotated within the journal 62 and be further rotated with respect to standard 22. It can also be adjusted in height above the ground surface.

Depending upon the desired range of height adjustment, additional bores 66 might be provided at the standard 22 for receiving a second pin 68 which might mount to the standard 22 beneath the journal 60. Alternatively, the length of the shaft 64 can be varied within a range, but which can affect the overall height of the collapsed assembly, as will become more apparent hereinafter.

Figure 4:
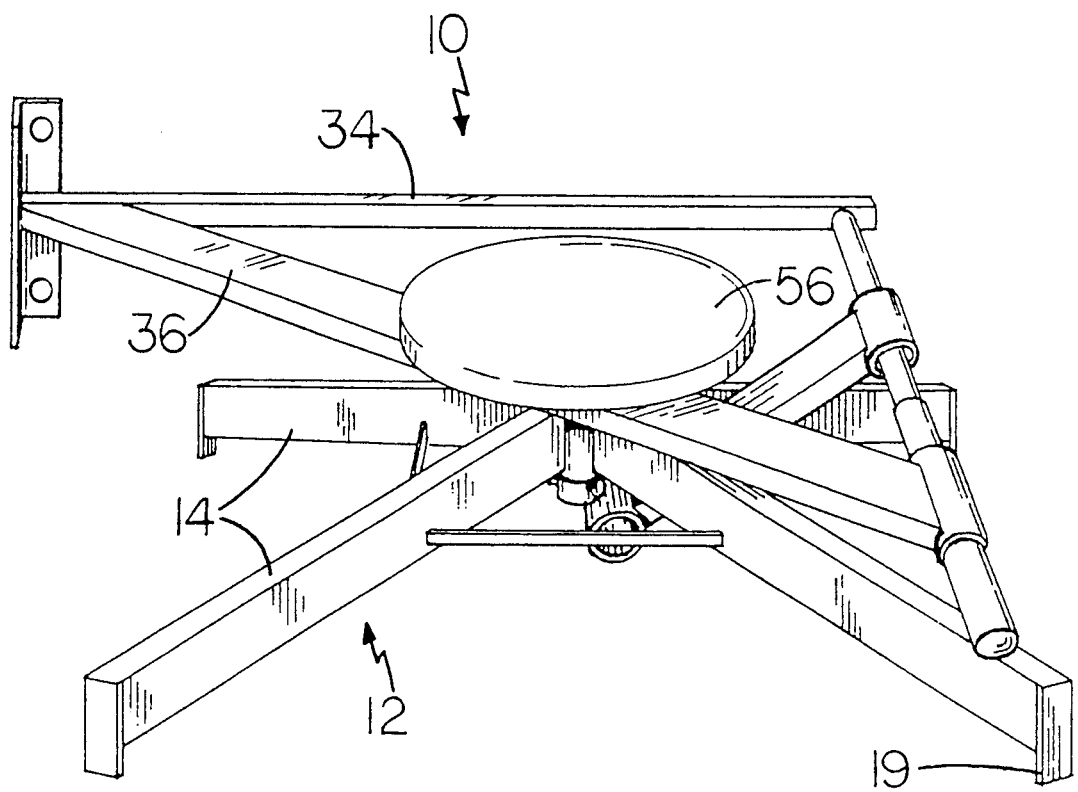
FIG. 4 shows an isometric view of a collapsed shooting stand with the individual pieces locked to one another for transport.
Figure 5:
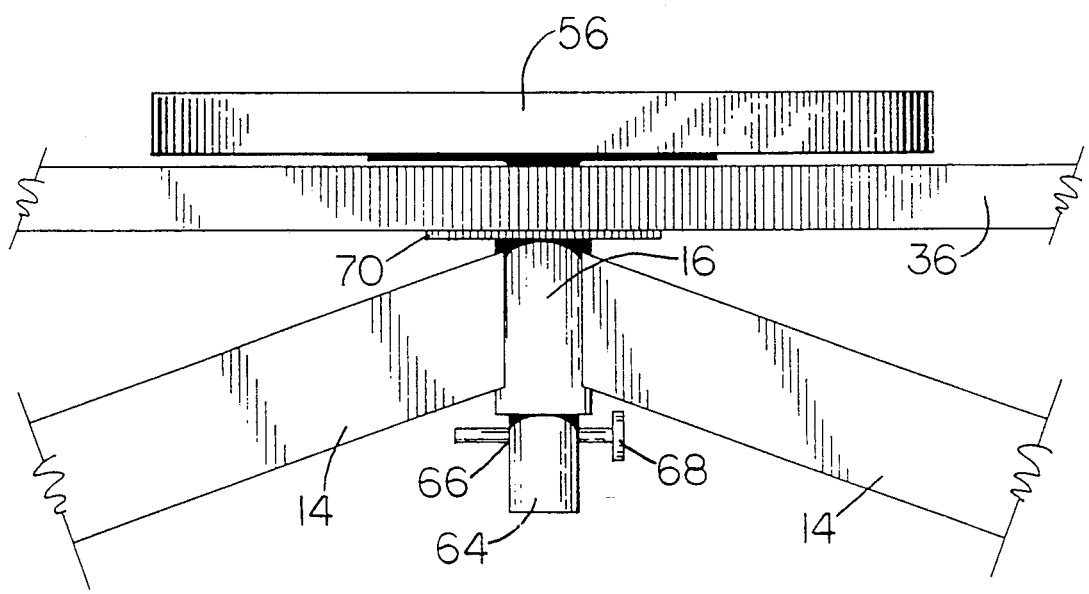
FIG. 5 shows an elevation view in partial cross-section of the stand parts as they mount to one another in locked relation to the base.

Referring to FIGS. 4 and 5, the gun stand 10 is collapsed by first removing shaft 64 from journal 62 and pin 68 from bore 66. The end 24 of standard 22 must also be removed from journal 16. The primary components of the gun stand 10 can then be rearranged and locked into a position which more readily accommodates transportation to a different location.

For this purpose, a plate 70 is rigidly mounted approximately midway along the frame member 36, as by welding. Plate 70 is also provided with a hole 72 sized to receive shaft 64, such that when the stand 10 is folded or collapsed, plate 70 is placed over journal 16 with the hole 72 in alignment with bore 18. The framework 32 is also positioned such that the arm 58 is captured between the legs 14 and the frame member 36. Shaft 64 is inserted into the hole 72 and bore 18 and the pin 68 is inserted into a selected bore 66 immediately below journal 16 as shown in FIG. 5. The pin 68 is then re-inserted into the first most accessible bore 66 beneath the journal 16.

Once pin 68 is in place, the individual parts of the stand 10 are locked together and enable the transport of the stand 10 to a different location. This may be effected by using the member 32 as a handle. In its collapsed condition the stand measures approximately 30×30×12 inches and weighs approximately 25 pounds.

The stand 10 is reassembled by reversing the foregoing procedure and by removing pin 68 from the bore 66 and the framework and seat assemblies 32 and 55 from the base 12. The base 12 is then positioned at a desired location. The end 24 of the standard 22 is re-inserted into bore 18 and shaft 64 is placed in journal 62, with the height of the seat 56 being readjusted by inserting pin 68 in the desired bore 66. Similarly, the barrel rest 38 may be re-positioned as necessary on horizontal member 34 by making appropriate adjustments with wing nuts 48 and 50.

In operation, a shooter places a rifle or pistol barrel in the barrel rest 38 and sits on seat 56. Since the gun barrel is only supported at a single location, the shooter can move the gun as necessary to make corrections for elevation or windage. The shooter can also rotate the triangular stanchion framework 360 degrees while remaining seated on seat 56 to change shooting directions. The seat assembly 55, and the seat 56 within the journal 62, may also be rotated in a horizontal plane around the standard 22 to accommodate right or left handed shooters and all without the necessity of rising from the stand 10. The weight of the shooter otherwise locks the joints of framework against movement, although, set screws or other positive position locking means could be provided at each framework joint.

While the fundamental novel features of the invention have been shown and described, it should be understood that various substitutions, modifications and variations may be made by those skilled in the art without departing form the spirit or scope of the invention. Accordingly, it is contemplated that the following claims should be interpreted to include all such modifications or variations within the scope thereof.

What is claimed is:

1. A collapsible support stand comprising:
   (a) a base;
   (b) a framework including an upright standard mounted to the base for rotation about a longitudinal axis of the standard, a horizontal member attached to an upper end of the standard, and in a hypotenuse member rigidly connecting a terminal portion of the horizontal member to the standard at a position adjacent a lower end of the standard; and
   (c) a seat and a support arm including means for rotatively coupling the seat to the arm and the arm to the standard for movement about the standard and further including means for adjusting the height of the seat.

2. Apparatus as set forth in claim 1 including means for securing said base to the ground.

3. A collapsible firearms support stand comprising:
   (a) a base;
   (b) a framework including an upright standard, a horizontal member, means for supporting the horizontal member to the standard, and means for rotatively securing the standard to the base;
   (c) a seat and means for coupling the seat to the standard for rotation about the base; and
   (d) means secured to the horizontal member for supporting a firearm.

4. A collapsible support stand comprising:
   (a) a base having a plurality of legs radially extending from an upright tubular sleeve having a bore;
   (b) a triangular framework including an upright standard having an end sized to mount in the sleeve bore, a horizontal member connected to and projecting from the standard, and a hypotenuse member having one end connected to the standard adjacent a lower end of the standard and having another end rigidly connected to a distal portion of the horizontal member;
   (c) a V-shaped support;
   (d) means for selectively securing the V-shaped support to the horizontal member; and
   (e) a seat assembly including a support arm having first and second transversely mounted journals and wherein the first journal is rotatively mounted to the standard, a seat having a shaft projecting therefrom and rotatively mounting within the second journal and wherein the shaft includes a plurality of transverse bores and a pin which selectively mounts within a selected one of the transverse bores to establish the height of the seat above the support arm.

5. Apparatus as set forth in claim 4 further including a plate member rigidly mounted to the triangular framework and having a hole therethrough, whereby the stand may be locked in a collapsed configuration by aligning the hole of the plate with the bore in the sleeve and inserting the shaft of the seat through the hole and inserting the pin through a transverse bore of the shaft exposed opposite the bore in the sleeve.

6. Apparatus as set forth in claim 4 including a plurality of braces which extend between adjacent legs of the base.

7. Apparatus as set forth in claim 4 wherein each leg includes a ground piercing end portion.

8. Apparatus as set forth in claim 4 including a transverse frame member secured to a distal end of said horizontal member.

9. Apparatus as set forth in claim 4 wherein said V-shaped support securing means includes a bracket sized to slide along the horizontal member and means for fixing the bracket at a selected location.

10. Apparatus as set forth in claim 9 wherein said V-shaped support includes an upright member which couples to said bracket and fastener means cooperating with said upright member for compressing an end portion of said bracket means at a selected extension of said upright member relative to said bracket means.

11. Apparatus as set forth in claim 4 wherein said V-shaped support includes an elastomeric covered surface.

* * * * *